United States Patent [19]
Rawlings

[11] Patent Number: 4,533,679
[45] Date of Patent: Aug. 6, 1985

[54] REINFORCED POLYESTER COMPOSITION HAVING AN IMPROVED STRENGTH

[75] Inventor: Herbert L. Rawlings, New Martinsville, W. Va.

[73] Assignee: Mobay Chemical Corporation, Pittsburgh, Pa.

[21] Appl. No.: 392,846

[22] Filed: Jun. 28, 1982

[51] Int. Cl.³ ............................................. C08L 67/02
[52] U.S. Cl. ................................... 523/204; 524/539; 524/605; 525/438
[58] Field of Search ............... 525/438; 524/605, 601, 524/539; 523/204

[56] References Cited

U.S. PATENT DOCUMENTS

| | | | |
|---|---|---|---|
| 3,368,995 | 2/1968 | Furukawa et al. | 260/40 |
| 3,547,873 | 12/1970 | Weissermel et al. | 260/40 |
| 3,560,605 | 2/1971 | Siggel | 525/438 |
| 3,632,402 | 1/1972 | Weissermel et al. | 117/100 C |
| 3,723,568 | 3/1973 | Hoeschele | 525/438 |
| 3,843,615 | 10/1974 | Herwig et al. | 260/860 |
| 3,886,104 | 5/1975 | Borman et al. | 260/22 EP |
| 4,123,415 | 10/1978 | Wambach | 260/40 R |
| 4,141,882 | 2/1979 | Kodama et al. | 260/40 R |
| 4,212,791 | 7/1980 | Avery | 525/444 |
| 4,215,032 | 7/1980 | Kobayashi | 525/438 |
| 4,222,928 | 9/1980 | Kawamura | 525/438 |
| 4,223,113 | 9/1980 | Bier | 525/439 |
| 4,229,553 | 10/1980 | Sterzel et al. | 525/438 |
| 4,246,378 | 1/1981 | Kometani | 525/438 |
| 4,284,596 | 8/1981 | Inokuchi et al. | 264/45.3 |

FOREIGN PATENT DOCUMENTS

| | | |
|---|---|---|
| 2042447 | 4/1971 | Fed. Rep. of Germany . |
| 1111012 | 4/1968 | United Kingdom . |
| 1224684 | 3/1971 | United Kingdom . |
| 2015014 | 2/1979 | United Kingdom . |
| 2015013 | 9/1979 | United Kingdom . |

Primary Examiner—John C. Bleutge
Assistant Examiner—Patricia Short
Attorney, Agent, or Firm—Gene Harsh; Lawrence S. Pope; Aron Preis

[57] ABSTRACT

The present invention is directed to a thermoplastic molding composition comprising a high molecular weight polyester, a reinforcing amount of a reinforcing agent and a polyepoxy compound characterized in that it contains more than two terminal epoxy functionalities per molecule.

1 Claim, No Drawings

REINFORCED POLYESTER COMPOSITION HAVING AN IMPROVED STRENGTH

FIELD OF THE INVENTION

The invention is directed to thermoplastic polyester compositions and, more particularly, to compositions comprising reinforced poly(alkylene terephthalate).

BRIEF DESCRIPTION OF THE INVENTION

Reinforced poly(alkylene terephthalate) thermoplastic polymers are imparted improved mechanical properties by the addition of an effective amount of polyepoxy compound having more than 2 epoxy functionalities per molecule thereto.

BACKGROUND OF THE INVENTION

Poly(alkylene terephthalates) are useful thermoplastic resins that because of their excellent physical properties, such as wear resistance, durability and dimensional stability, find wide usage in the manufacture of fibers, films and molded articles. The level of their mechanical properties has been disclosed to be improved upon the incorporation of reinforcing agents therewith, for instance, glass fibers (British Pat. No. 1,111,012, U.S. Pat. Nos. 3,368,995, 4,123,415 and DAS No. 2,042,447).

The art is noted to include U.S. Pat. No. 3,632,402 which discloses molding compositions based on saturated polyesters containing, inter alia, a certain polyfunctional epoxy, which compositions are characterized in that their mechanical properties are maintained. Also, U.S. Pat. No. 4,229,553 is noted to disclose poly(alkylene terephthalate) molding materials containing a diepoxide as a thermal stabilizer.

Further, U.S. Pat. No. 3,886,104 is noted to disclose glass reinforced poly(alkylene terephthalate) compositions rendered thermally stable by the addition of certain internal polyfunctional epoxides, and British Pat. No. 2,015,014 is noted to disclose an epoxy formed from bisphenol A and epichlorohydrin as an additive to certain glass fiber reinforced poly(ethylene terephthalate) compositions. British Pat. No. 1,224,684 discloses compositions consisting of polyethylene terephthalate, a nucleating agent and a compound having two terminal epoxy groups, said to offer advantages in terms of rate of crystallization and the absence of flash formation. Also, U.S. Pat. No. 3,843,615 is noted to teach certain epoxides as cross-linking agents in polyesters. The process for producing foamed articles of aromatic polyesters taught in U.S. Pat. No. 4,284,596 is noted to entail a composition comprising polyepoxy compounds having at least two epoxy groups in the molecule. Among the polyepoxy compounds (at column 7, lines 1–5) there is described an epoxy compound suitable in the present invention.

DETAILED DESCRIPTION OF THE INVENTION

The high molecular weight, thermoplastic polyester resins suitable in the practice of the invention are derived from an aromatic dicarboxylic acid and a diol component and are characterized in that their intrinsic viscosity is at least 0.4 deciliters per gram. Optionally, the aromatic dicarboxylic acid component accounts for at least 85 mole percent of the dicarboxylic acid component. Among the suitable aromatic dicarboxylic acids are terephthalic acid, isophthalic acid, naphthalenedicarboxylic acid, diphenyletherdicarboxylic acid, diphenyldicarboxylic acid, diphenylsulfone dicarboxylic acid and diphenoxyethane dicarboxylic acid. The optional, at most 15 mole percent of the acid component which is not aromatic dicarboxylic, may be represented by hydroxycarboxylic acids and by aliphatic dicarboxylic acids such as succinic acid, adipic acid and sebacic acid.

The diol component of these polyesters may contain from 2 to 10 carbon atoms, preferably from 2 to 4 carbon atoms in the form of linear methylene chains with up to 30 mole percent of one or more other aliphatic diols having 3 to 8 carbon atoms, cycloaliphatic diols having from 6 to 15 carbon atoms or aromatic diols having from 6 to 21 carbon atoms. Examples of such additional diols ("codiols") include 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxy-ethoxyphenyl)propane and 2,2-bis-(4-hydroxy-propoxyphenyl)-propane.

Typical examples of the diol include polymethylene-α,ω-diols such as ethylene glycol, trimethylene glycol, tetramethylene glycol and hexamethylene glycol, neopentyl glycol, cyclohexane dimethylol, tricyclodecane dimethylol, 2,2-bis(4-β-hydroxyethoxyphenyl)propane, 4,4'-bis(β-hydroxyethoxy)diphenylsulfone, and diethylene glycol.

The polyesters may be branched by incorporating trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mole % of branching agent, based on the quantity of acid component. The polyesters may also contain known monofunctional compounds such as phenol or benzoic acid as chain terminators.

The preferred polyesters are characterized in that their structure comprises units of the general formula (I):

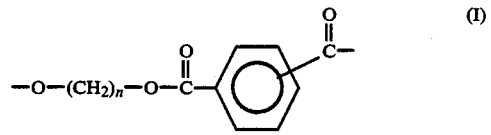

where n denotes 2 to 4.

The most preferred poly(alkylene terephthalate) in the present context is poly(ethylene terephthalate). The intrinsic viscosity characterizing the suitable polyester resins in the practice according to the invention should preferably be in the range of 0.4 to 1.4 grams per deciliter and, more preferably, between 0.4 and 0.8 grams per deciliter, as measured in a 1% solution of phenol and tetrachloroethane (60:40) at 25° C.

Methods for the preparation of the polyester resin suitable in the present context are known and have been described in U.S. Pat. Nos. 2,465,319 and 3,047,539.

The composition of the invention may include crystallization rate promoters for the polyester such as to allow lower mold temperatures and shorter injection cycles. Suitable promoters have been taught in U.S. Pat.

No. 4,223,113 which disclosure is incorporated herein by reference.

Essentially, the compounds to be employed as the oligomeric polyester may consist of structural units of the formulae (1) or (2)

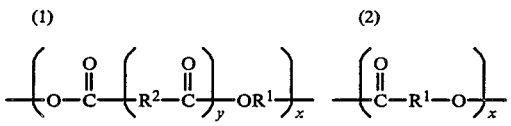

or mixtures thereof
wherein
$R^1$ denotes a linear or branched aliphatic, cycloaliphatic or araliphatic divalent radical with 2 to 20C atoms, preferably 2 to 10C atoms, $R^2$ denotes a linear or branched aliphatic, cycloaliphatic, araliphatic or aromatic divalent radical of 2 to 20, preferably 3 to 10C atoms, and x denotes an integer of at least 2, up to any value giving the oligomer a number-average molecular weight of 6000 or less, y is an integer of 0 or 1, in the former case the oligomer is an aliphatic polycarbonate which is a special type of polyester.

Of course, mixtures of different compounds which fall under the above formula can also be employed.

Preferred oligomeric polyesters are those which are derived from the following acids and alcohols: di- and tricarboxylic acids, adipic acid, azelaic acid, citric acid C(OH)(COOH)(CH₂COOH)₂ fumaric, maleic acid HOOCHC=CHCOOH glutaric acid, phthalic, isophthalic, terephthalic acid, trimellitic acid, trimesitinic acid, succinic acid, tartaric acid HOOC(CHOH)₂COOH sebacic acid, monocarboxylic acids, cresotic acid, salicyclic acid, acetic acid, isobutyric acid, caproic acid, caprylic acid, pelargonic acid, 2-ethylhexanoic acid, lauric acid, myristic acid, palmitic acid, stearic acid, oleic acid CH₃(CH₂)₇CH=CH(CH₂)₇COOH, ricinolic acid CH₃(CH₂)₅CH(OH)CH₂CH=CH(CH)₇COOH, 2-ethylbutyric acid, behenic acid, benzoic acid, abictic acid, 2-phenylbutyric acid, tall oil, fatty acid, di- and higher functional alcohols, ethylene glycol, propane diol 1,3/1,2, butanediol 1,3/1,4, pentanediol 1,5, hexanediol 1,6, dipropylene glycol 1,3/1,2, diethylene glycol, triethylene glycol, tetraethylene glycol, polyethylene glycol $M_n$ 400, neopentyl glycol HO—CH₂—C(CH₃)₂—CH₂OH, glycerol HOCH₂—CHOH—CH₂OH, trimethylolethane CH₃C(CH₂OH)₃, trimethylolpropane C₂H₅C(CH₂OH)₃, pentaerythritol C(CH₂OH)₄, 2,2,4-trimethyl-1,3-pentanediol, sucrose, monofunctional alcohols, 2-ethylhexanol, isonol, tertiary butanol, methanol, isopropanol

octylbenzyl alcohol, butyl alcohol, isobutyl alcohol, 2-ethylhexanol, isononyl alcohol, n-octyl alcohol, isooctyl alcohol, n-decyl alcohol, isodecyl alcohol, butoxyethyl alcohol CH₃(CH₂)₃—O(CH₂)₂OH, butoxyethyloxyethyl alcohol CH₃(CH₂)₃—O(CH₂)₂O(CH₂)₂OH, cyclohexylalcohol,

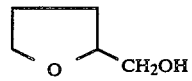

n-hexyl alcohol, tetrahydrofurfuryl alcohol, 2-butoxyethyl alcohol CH₃—CH—(OCH₂CH₂OH)—CH₂CH₃, ethyl alcohol, amyl alcohol, n-undecyl alcohol, tridecyl alcohol, butylbenzyl alcohol, methylcyclohexyl alcohol, methoxyethyl alcohol, benzyl alcohol, allyl alcohol CH₂=CH—CH₂OH, hydroabietyl alcohol.

Especially preferred oligomers are those using adipic acid or sebacic acid as the dicarboxylic acid, 2-ethylhexane-1,3-diol, 2,2,4-trimethylpentane-1,3-diol, butane-1,3-diol, hexane-1,6-diol or butane-1,4-diol as the diol component and 2-ethylhexanol, 3,5,5-trimethylhexanol or n-butanol as the monohydric alcohol component.

Particularly suitable oligomers are poly-(butane-1,3-diol adipate), poly-(hexane-1,6-diol adipate) and poly-(butane-1,4-diol adipate).

The polyepoxy compounds suitable in the context of the invention are characterized in having more than two, preferably 3 to 5, most preferably 4, terminal epoxide functionalities per molecule. Among the suitable compounds are those described by the general formula, (II)

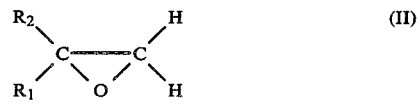

wherein
$R_1$ denotes a hydrogen atom or an alkyl radical, preferably H or a $C_1$–$C_4$ alkyl radical, and $R_2$ denotes a polyvalent radical containing more than one additional terminal epoxide functionality. Preferably, $R_2$ may be selected from among the group consisting of alkyl, cycloalkyl, polyalkyl, aralkyl, polyaralkyl and aryl radicals, all of which may contain ester, thioester, amine, amide, ether, thioether or ketone groupings with the proviso that in any case $R_2$ contains more than one terminal epoxide functionality.

Further suitable polyepoxy compounds suitable in the present practice are the reaction products of chloroalkyl oxiranes with active hydrogen compounds which products may be represented by the general formula, (III)

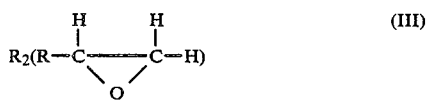

where R is a $C_1$–$C_4$ alkyl and $R_2$ is as defined above.

Examples of the above polyepoxides are the polyepoxidized reaction products of epichlorohydrin with hydrocarbon polymers containing terminal and pendant hydroxyl, amine, or carboxyl groups; the polyepoxidized reaction products of epichlorohydrin and polyhydric alcohols such as pentaerythritol made by the reaction of formaldehyde and acetaldehyde in the presence of lime; the polyepoxidized reaction products of epichlorohydrin and tetraphenolated hydrocarbons made by the acid catalyzed reaction of phenol and dialdehydes; and the polyepoxidized reaction products of polyamines made by the acid catalyzed reaction of aniline and formaldehyde.

More specifically preferred polyepoxides in the present context are N,N'-(methylenedi-4,1-phenylene)-bis[N-(oxiranylmethyl)-oxiranemethanamine](Ciba-Geigy MY-720), 1,2-ethane diylidenetetrakis(4,1-phenyleneoxy methylene)-tetrakis-oxirane, (Shell Epon 1031), tetrakis(methoxymethylene oxirane)methane; and copolymers of alkyl acrylates specifically methacrylates, butadiene, styrene, acrylonitrile, other alkanes and substituted alkenes, with oxiranyl methyl esters of acrylates or methacrylates.

The preparation of the polyepoxy compounds suitable in the practice in accordance with the invention is known in the art and has been described in, among others, British Pat. No. 774,663 and U.S. Pat. No. 3,954,650 incorporated herein by reference.

The compositions in accordance with the invention contain a reinforcing amount of a reinforcing agent. Generally, any reinforcing agent can be used, for example fibers, whiskers, platelets of metals or of non-metals (including organic materials such as polyaramid fibers) including aluminum, iron, nickel, ceramics, carbon filaments, silicates, asbestos, silica, mica and glass. In the present context, a reinforcing agent is one, or more, of the above that adds to any of the strength, stiffness or impact properties of the matrix wherein it has been incorporated.

Although it is only necessary to have at least a reinforcing amount of the reinforcing agent incorporated in their matrix, the present compositions comprise from about 5 to about 60, preferably about 10 to about 50, percent by weight of reinforcing agents, the percentages being in relation to the total weight of the polyester and reinforcing agents.

The preferred reinforcing agent is glass fibers.

Suitable glass fibers in the present context are available in commerce (for instance, PPG 3540 and OCF 416CB) and are characterized in that their chemical makeup render them substantially unreactive with the matrix. The known C-glass, S-glass and E-glass types are suitable.

Although the length of the glass fibers introduced is not particularly critical to the invention, chopped strands of ⅛-1" in length are conveniently used. The length of the fibers in the molded product is generally less than ⅛". The diameter of the glass fibers may average between 5 to 15 microns and it too is not critical to the invention, although best results are obtained using fibers that are 7 to 13 microns in average diameter.

Any effective amount of the polyepoxy compound may be used in the composition of this invention. In general, however, the amount of the polyepoxy compound useful in the compositions of the invention is between about 0.05 and 5.0 percent, preferably 0.08–1.0, most preferably between about 0.1 and 0.8, percent relative to the total weight of the polyester resin plus reinforcement.

In general, the best properties will be obtained in compositions comprising sized reinforcing agents although as is demonstrated below compositions incorporating unsized reinforcing agents appear to be improved upon the addition of the instant polyepoxy which appears to function as a coupling agent.

The method of blending the composition of this invention is not critical and may be carried out by any of the known conventional techniques. In accordance with one procedure, the polyester in powder or granular form, the reinforcing agent and the polyepoxy compound and other suitable additives may be blended and the blend extruded and comminuted into pellets or other convenient form. The composition thus prepared is suitable as a molding composition in a variety of thermoplastic processes. The following examples illustrate the preparation of compositions within the scope of the present invention. These examples are not to be construed to in any way limit the invention but rather to demonstrate its operability.

EXAMPLES

Example 1

Compositions according to the invention nominally comprising 70 parts by weight (pbw) of poly(ethylene terephthalate) having an intrinisic viscosity of about 0.6 dl/gm, a commercial product of Eastman Kodak available under the trade name of TENITE 7741, and 30 pbw of glass fibers (PPG 3540) were prepared and tested as shown below. The dependence of the properties on the amount of the polyepoxy added to the compositions is apparent upon a comparison with the control (Example 1-1) whereto no epoxide was added. In addition to the major components noted above, the compositions all contained minor amounts of a crystallization rate promoter, a nucleating agent and thermal and hydrolytic stabilizers in accordance with U.S. Pat. No. 4,223,113.

The polyepoxy resin (EPON 1031) was mixed into the molten composition by extrusion compounding. The extruder, a two stage, single screw (2.75:1) equipped with vacuum vent between stages was operated at 65 rpm at a temperature profile of 280°/280°/270°/260°/245°/275° C. (r→f).

TABLE 1

| Component/Test | Unit | 1-1 | 1-2 | 1-3 | 1-4 | 1-5 |
|---|---|---|---|---|---|---|
| EPON 1031 conc'n | % | 0 | .1 | .2 | .3 | .5 |
| IZOD, ⅛ Notch | J/M | 79 | 80 | 86 | 97 | 86 |
| IZOD, ⅛ Unnotch | J/M | 660 | 790 | 550 | 980 | 770 |
| Tensile @ Break | MPa | 129 | 141 | 147 | 152 | 151 |
| Tensile Retention[1] | % | 67 | 86 | 90 | 87 | 93 |
| Flexural Modulus | GPa | 9.9 | 9.9 | 9.3 | 10.3 | 9.9 | 9.9 |
| Flexural Strength | MPa | 186 | 224 | 232 | 240 | 225 |

[1]After ageing, 8 hours at 121° C. in saturated steam.

Example 2

An improvement in the mechanical properties associated with addition of polyepoxide is demonstrated below to be substantially independent of the crystallization rate of poly(ethylene terephthalate). The compositions all nominally based on 70 pbw of PET (TENITE 7741) and 30 pbw of glass fibers (PPG 3540) were prepared by the same procedure described in Example 1 above.

TABLE 2

| Component/Test | Unit | 2-1 | 2-2 | 2-3 | 2-4 |
|---|---|---|---|---|---|
| Oligomeric polyester I[1] conc'n | % | 0 | 0 | 4.9 | 4.9 |
| EPON 1031 conc'n | % | 0 | 0.3 | 0 | 0.3 |
| IZOD ⅛ Notch | J/M | 84 | 75 | 79 | 100 |
| IZOD ⅛ Unnotch | J/M | 790 | 420 | 660 | 780 |
| Tensile @ Break | MPa | 159 | 162 | 130 | 153 |
| Tensile Retention 8 hr. Autoclave[2] | % | 73 | 90 | 67 | 89 |
| Tensile Retention 16 hr. 400° F. | % | 94 | 84 | 78 | 80 |
| Flexural Modulus | GPa | 10.4 | 10.4 | 9.5 | 10.6 |

TABLE 2-continued

| Component/Test | Unit | 2-1 | 2-2 | 2-3 | 2-4 |
|---|---|---|---|---|---|
| Flexural Strength | MPa | 231 | 258 | 193 | 242 |

[1] Per U.S. Pat. No. 4,223,113, M.W. 2000, a crystallization promoter.
[2] Eight hours at 121° C., saturated steam.

Example 3

The compositions which properties are compared below were prepared in accordance with the procedure outlined above in Example 1 and are indicated to further demonstrate the efficacy of the polyepoxide additive in the present context. The polyester component used was TENITE 7741.

TABLE 3

| Component/Test | Unit | 3-1 | 3-2 | 3-3 | 3-4 |
|---|---|---|---|---|---|
| Glass Type Conc'n | — | 419AA[1] | 419AA[1] | 3540[2] | 3540[2] |
| Conc'n | % | 30 | 30 | 30 | 30 |
| EPON 1031 conc'n | % | 0 | 0.3 | 0 | 0.3 |
| IZOD, ⅛ Notch | J/M | 102 | 105 | 79 | 89 |
| IZOD, ⅛ Unnotch | J/M | 640 | 400 | 660 | 800 |
| Tensile @ Break | MPa | 135 | 141 | 130 | 152 |
| Elong'n | % | 2 | 3 | 2 | 2 |
| Flexural Strength | MPa | 197 | 212 | 193 | 235 |

[1] A product of Owens Corning Fiberglas Corp.
[2] A product of PPG, Inc.

Example 4

The series of experiments summarized in Table 4 demonstrates the efficacy of the polyepoxy compounds of the invention in imparting desirable mechanical properties to glass reinforced thermoplastic polyesters and compares these with the corresponding properties of the compositions modified with polyepoxides outside the present scope. Following the same preparation procedure as outlined above, the compositions were prepared, tested and evaluated as below. The compositions all comprised nominally, 70 pbw of PET (TENITE 7741) and 30 pbw of glass fiber (PPG 3540).

TABLE 4

| Component/Test | Unit | 4-1 | 4-2 | 4-3 | 4-4 | 4-5 | 4-6 | 4-7 |
|---|---|---|---|---|---|---|---|---|
| | | Internal Epoxides | | | None | TERMINAL EPOXIDES | | |
| Epoxide Functionality | No. | 2 | 4 | 5 | none | 1 | 2 | 4 |
| Epoxide Type[1] | — | A | B | C | — | X | Y | Z |
| Epoxide conc'n | % | 0.5 | 0.5 | 0.5 | 0 | 0.6 | 0.5 | 0.3 |
| IZOD, ⅛ Notch | J/M | 71 | 71 | 71 | 79 | 94 | 87 | 89 |
| IZOD, ⅛ Unnotch | J/M | 460 | 510 | 540 | 660 | 480 | 470 | 800 |
| Tensile @ Break | MPa | 136 | 138 | 141 | 130 | 95 | 142 | 152 |
| Tensile Retention [2] | % | 80 | 84 | 88 | 67 | 78 | 92 | 89 |
| Flexural Strength | MPa | 198 | 200 | 208 | 190 | 168 | 231 | 235 |

[1] A = Epoxidized butyl ester of linseed oil
B = Epoxidized soy bean oil
C = Epoxidized linseed oil
X = Phenyl glycidyl ether
Y = BPA/Epichlorohydrin reaction product
Z = Ethanediylidenetetrakis(4,1-phenyleneoxy methoxy)tetrakisoxirane, homopolymer
[2] After ageing 8 hours at 121° C. in saturated steam Table 4 compares the efficacy of polyepoxides containing internal oxirane groupings such as those of epoxidized vegetable oils with polyepoxides containing terminal oxiranes such as those found in EPON 1031 with the reaction products of epichlorohydrin with BPA. The table indicates:

(a) A comparison of 4-5 with 4-4 shows that a terminal monoepoxide is not only not strength enhancing but is actually deleterious to strength development in the model reinforced, crystallizable PET formulation.

(b) The series 4-1 through 4-3 and 4-5 through 4-7 show that the action of the epoxide function in improving the strength and ductility of reinforced PET is roughly proportional to the number of epoxides in the molecule. Of particular importance in light of prior art, is the comparison of 4-7 with 4-6 which shows the significantly improved ductility and strength resulting from use of a tetrafunctional epoxide such as EPON 1031 as compared with the model composition modified with the difunctional epichlorohydrin/BPA type epoxy resin.

(c) The contrasts of 4-6 with 4-1 and 4-7 with 4-2 indicate that the terminal epoxides, particularly the terminal epoxides of the resins disclosed in this invention are significantly more efficient than internal epoxides such as those shown in the example and disclosed in U.S. Pat. No. 3,886,104.

Example 5

The epoxide in accordance with the invention is shown upon comparing the properties of the composition of Example 5 to act as a coupling agent in the system of poly(alkylene terephthalate) glass reinforcement. The polyester and glass were as in Example 1 and the preparation of the compositions was in accordance with the procedure outlined there.

TABLE 5

| Component/Test | Unit | 5-1 | 5-2 | 5-3 |
|---|---|---|---|---|
| Glass type[1] | — | 861 × 10[3] treated | 861 × 10[2] sized | 861 × 10[4] |
| EPON 1031 Conc'n | % | 0 | 0.15 | 0.15 |
| IZOD ⅛ Notched | J/M | 52 | 74 | 62 |
| IZOD ⅛ Unnotched | J/M | 370 | 640 | 420 |
| Tensile @ Failure | MPa | 99 | 128 | 118 |
| Flexural Modulus | GPa | 8.8 | 9.6 | 9.3 |
| Flexural Strength | MPa | 130 | 190 | 178 |
| HDT 264 psi | °C. | 172 | 216 | 215 |

[1] 861 × 10 is a glass containing no organic material on its surface
[2] 861 × 10 treated with EPON 1031 in a solvent, then heat-treated to drive off the solvent and complete the SiOH/oxirane reaction.
[3] 861 × 10 treated as in [2] but without EPON 1031.
[4] 861 × 10 was dried at 220° F. overnight. EPON 1031 was added as a bulk additive.

What is claimed is:

1. A process for the preparation of a glass fiber reinforced thermoplastic polyethylene terephthalate composition comprising
(i) applying a polyepoxy compound having more than two terminal epoxy functionalities per molecule to said glass fibers, said polyepoxy conforming to the general formula

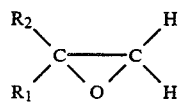

wherein $R_1$ denotes a hydrogen atom or an alkyl radical and $R_2$ is a polyvalent radical containing more than one additional terminal epoxide functionality and then (ii) incorporating the glass fibers of (i) in a thermoplastic polyethylene terephthalate resin, said polyepoxy being applied in sufficient amount to cause a reinforcing effect of said composition.

* * * * *